Figure 1:
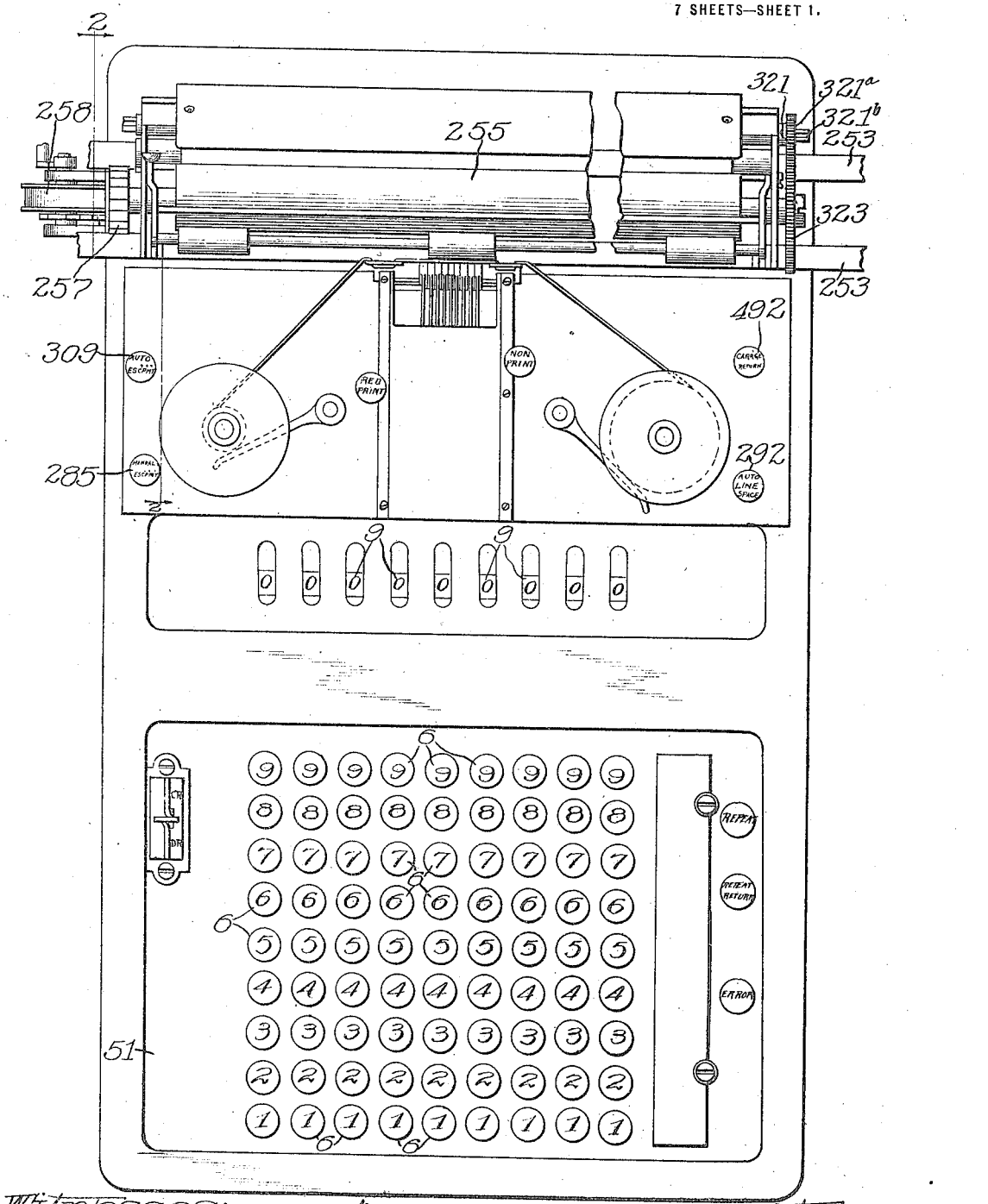

P. H. BERGER.
CALCULATING MACHINE.
APPLICATION FILED NOV. 11, 1912.

1,208,272.

Patented Dec. 12, 1916.
7 SHEETS—SHEET 1.

Witnesses:
Inventor:
Paul H. Berger
By Brown, Hopkins, Nissen & Sprinkle
Attys.

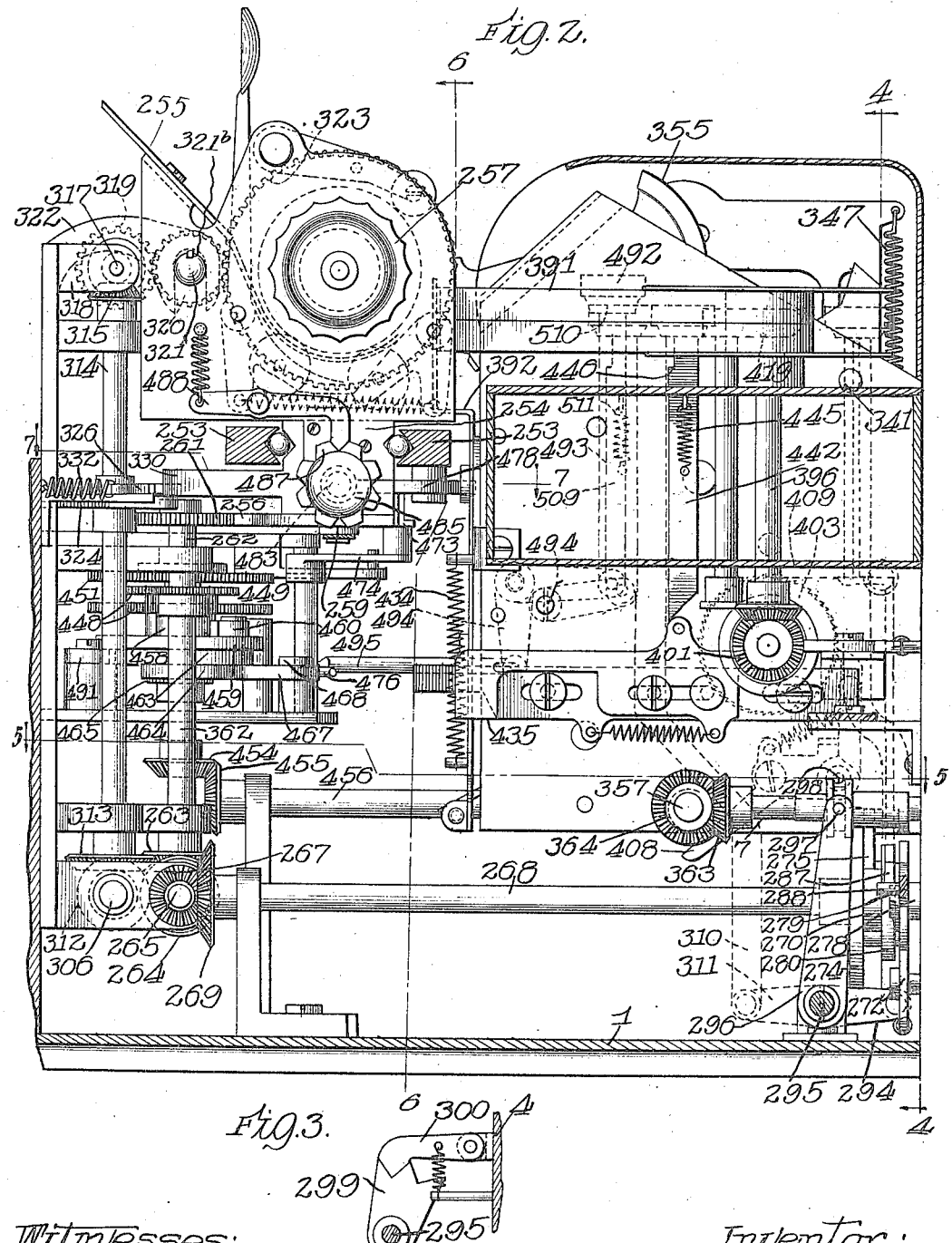

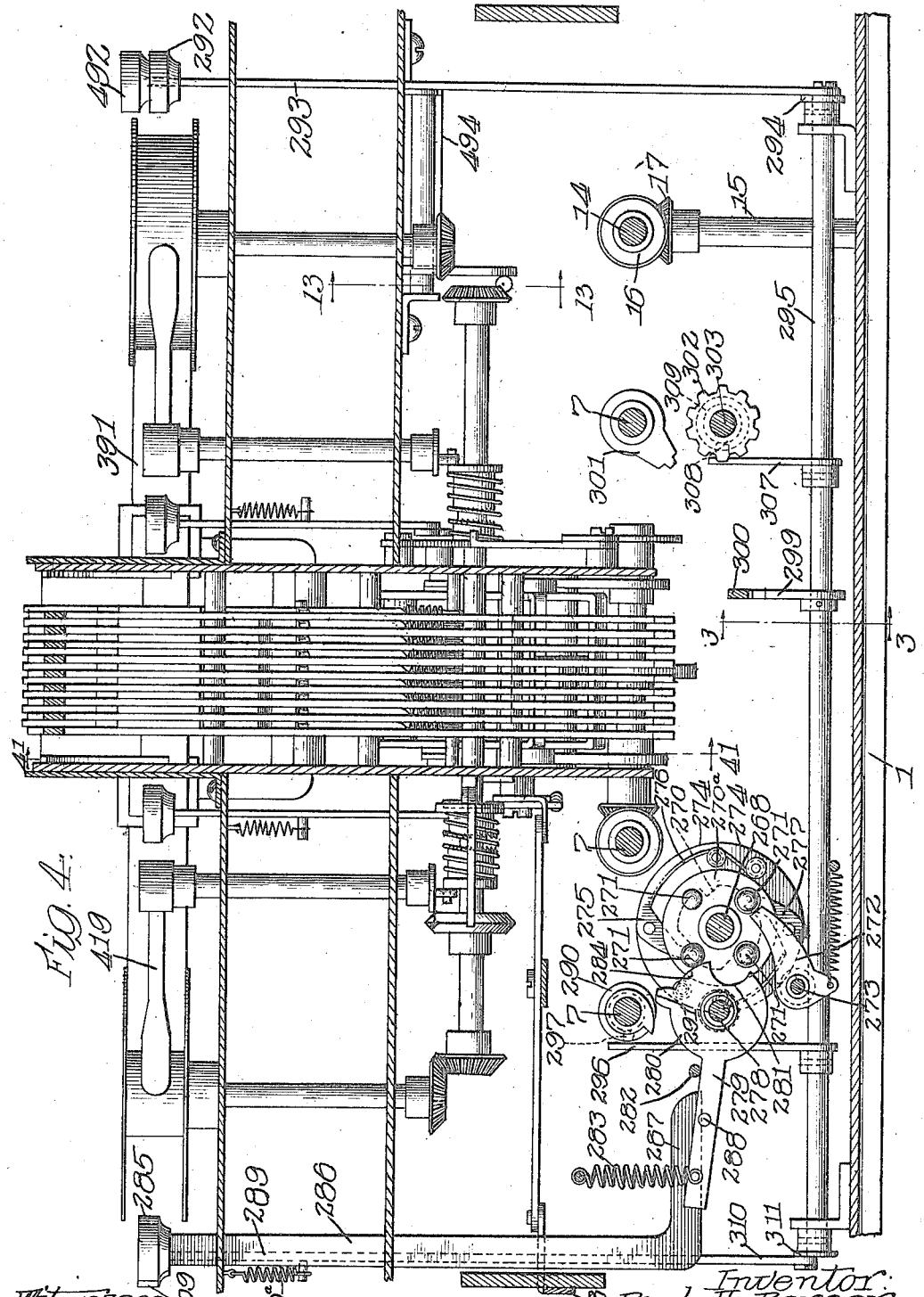

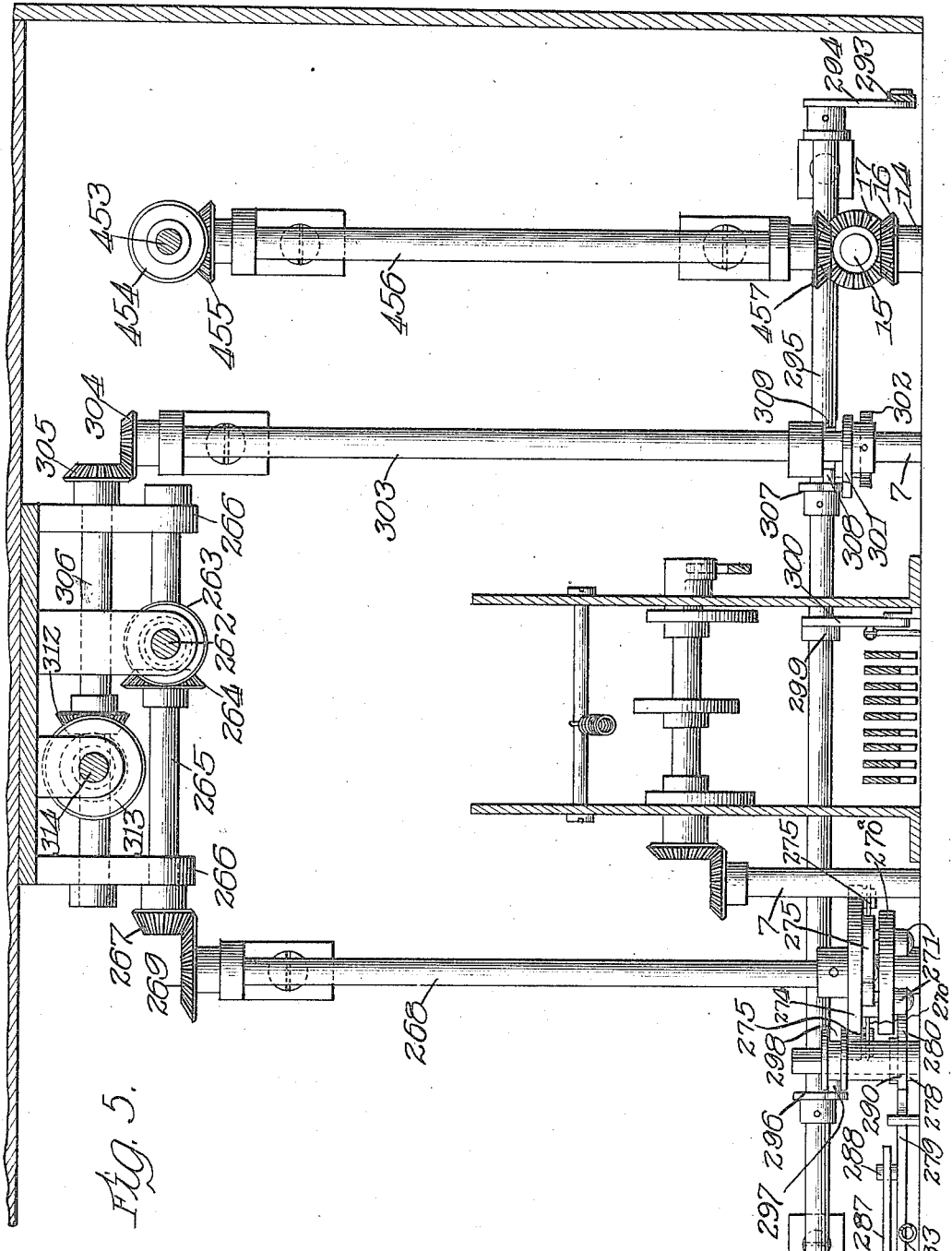

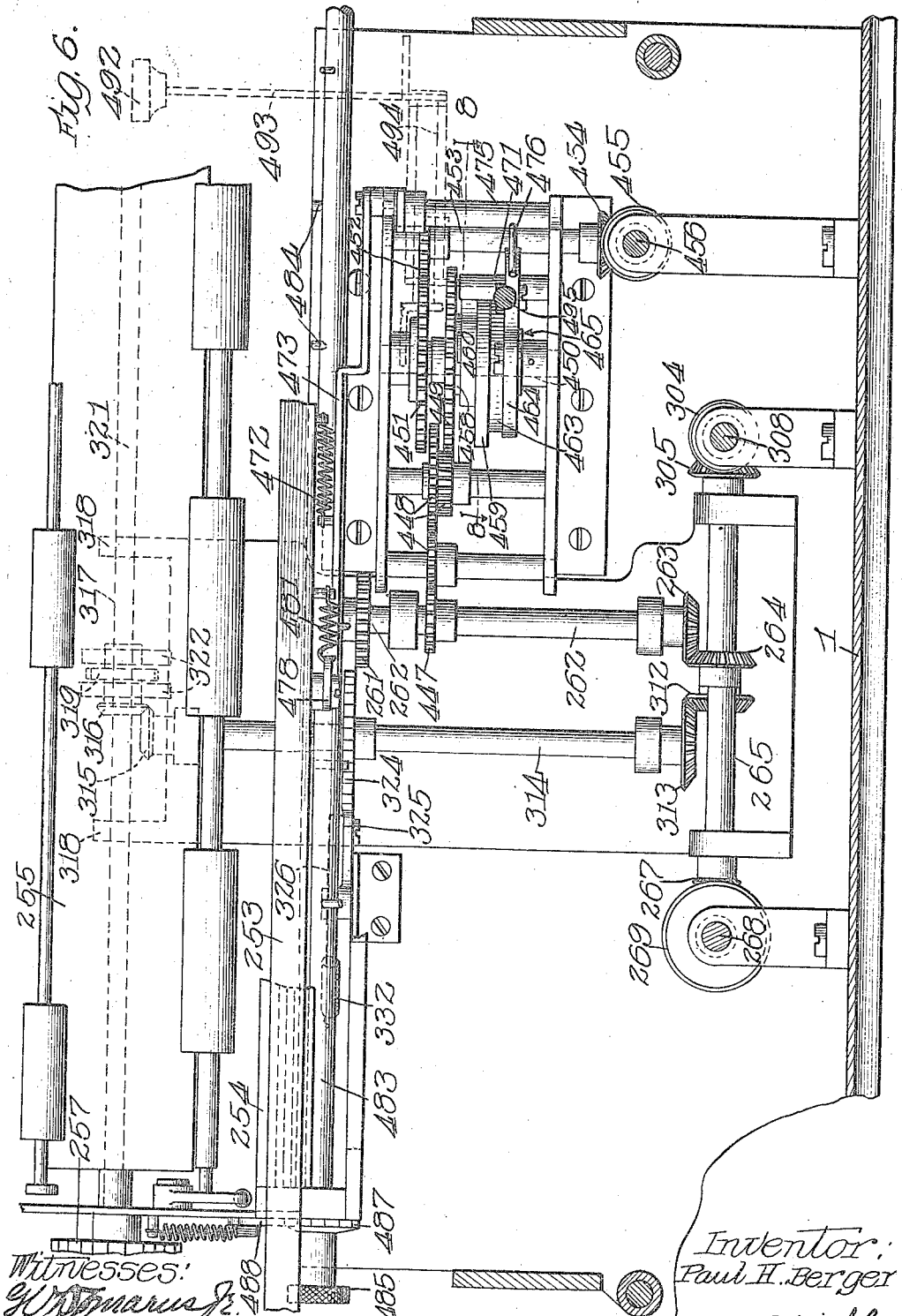

P. H. BERGER.
CALCULATING MACHINE.
APPLICATION FILED NOV. 11, 1912.
1,208,272.
Patented Dec. 12, 1916
7 SHEETS—SHEET 6.
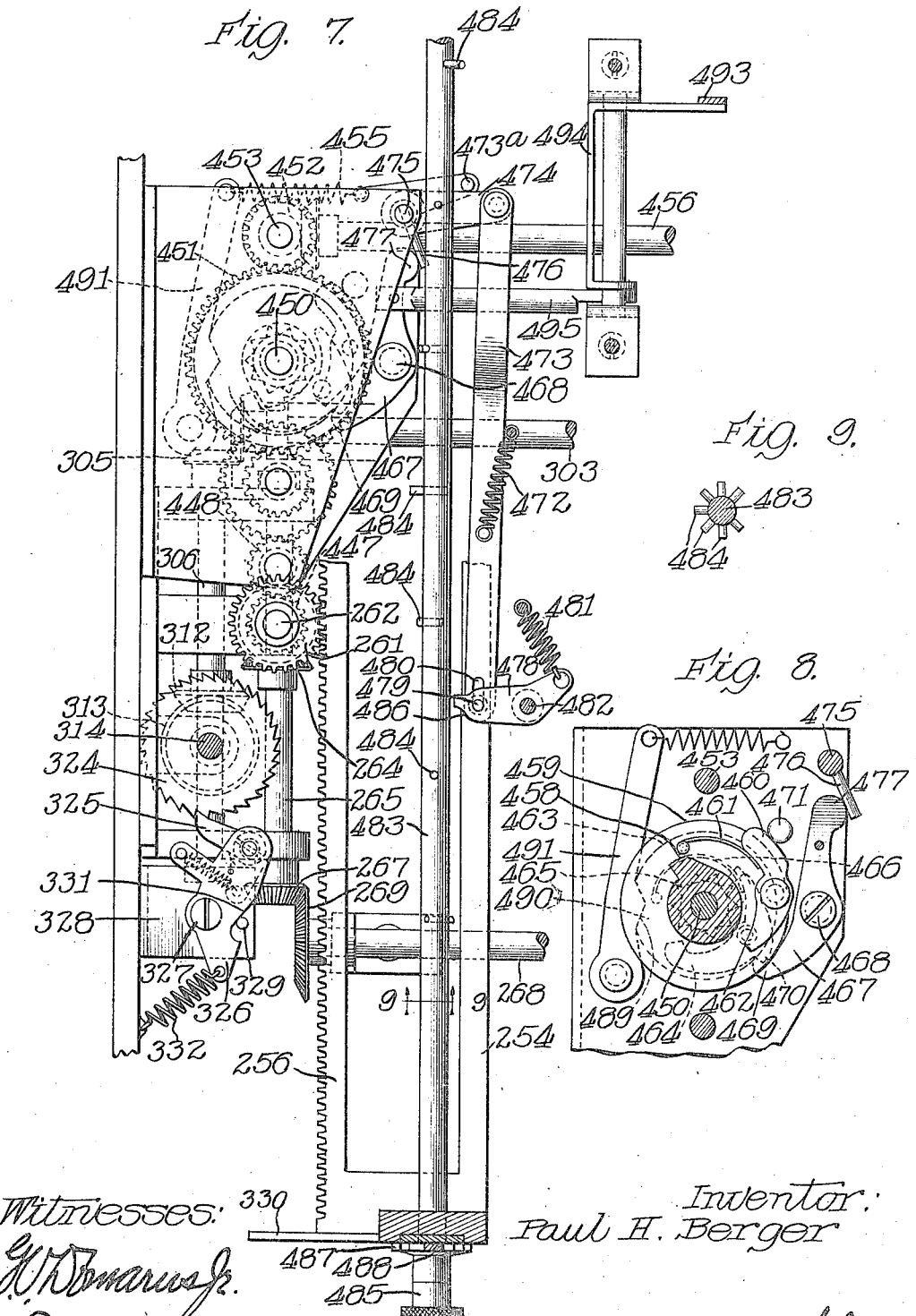

P. H. BERGER.
CALCULATING MACHINE.
APPLICATION FILED NOV. 11, 1912.
1,208,272.
Patented Dec. 12, 1916.
7 SHEETS—SHEET 7.
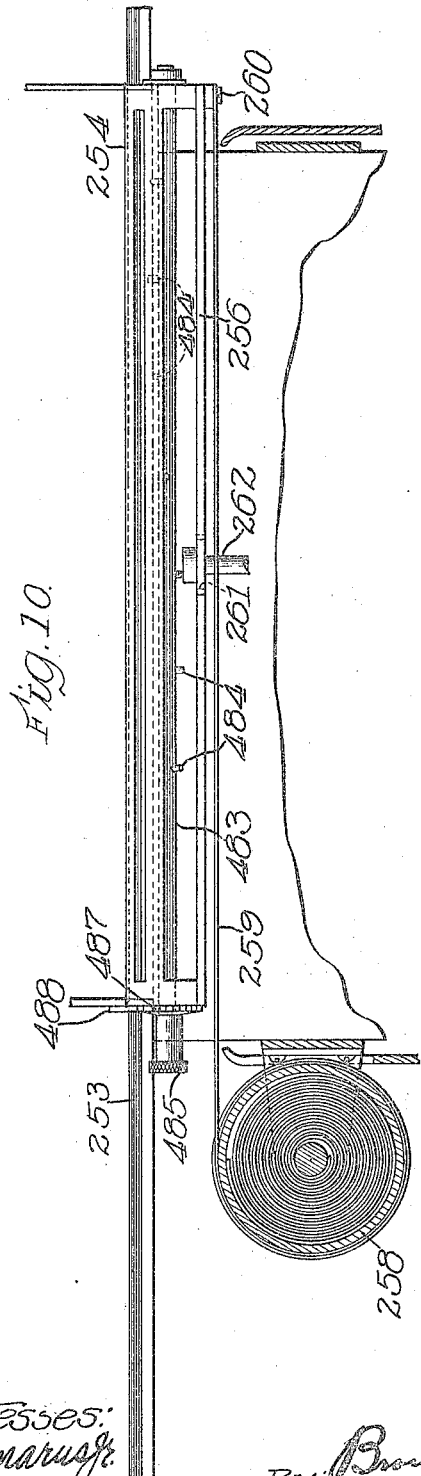
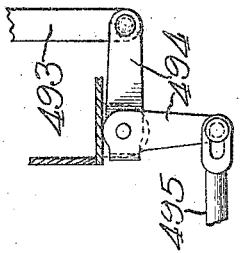
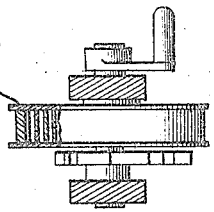
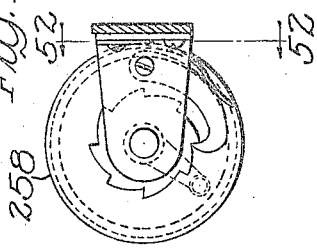
Inventor
Paul H. Berger
By Brown, Hopkins, Nissen & Spruck
Attys:
Witnesses:

UNITED STATES PATENT OFFICE.

PAUL H. BERGER, OF CHICAGO, ILLINOIS, ASSIGNOR TO CARLIN CALCULATOR COMPANY, OF CHICAGO, ILLINOIS, A CORPORATION OF ILLINOIS.

CALCULATING-MACHINE.

1,208,272.　　　Specification of Letters Patent.　　Patented Dec. 12, 1916.

Original application filed April 13, 1911, Serial No. 620,826. Divided and this application filed November 11, 1912. Serial No. 730,786.

*To all whom it may concern:*

Be it known that I, PAUL H. BERGER, a citizen of the United States, residing at Chicago, in the county of Cook and State of Illinois, have invented certain new and useful Improvements in Calculating-Machines, of which the following is a specification.

This invention relates to calculating machines in general, and particularly to the line spacing, escapement, tabulator, carriage return mechanisms and other carriage control features for a calculating machine which are designed to operate manually or automatically during the operation of the calculating machine. This application is a division of application Serial No. 620,826 filed by the applicant on the 13th of April 1911.

With the above and other objects in view as will hereinafter be apparent, this invention consists in the construction, combination and arrangement of parts all as hereinafter more fully described, claimed, and illustrated in the accompanying drawings, wherein:

Figure 1 is a top plan view of the calculating machine illustrating the coöperation thereof with the carriage control mechanism forming the subject matter of the present invention. Fig. 2 is a vertical section on line 2—2 of Fig. 1, illustrating the details of construction of the carriage control mechanism and coöperation thereof with the balance of the machine. Fig. 3 is a vertical section taken along the line 3—3 of Fig. 4 and illustrates the lock for the shaft whereby the line spacing and escapement of the carriage is controlled. Fig. 4 is a section taken on the line 4—4 of Fig. 2 and illustrates the control of the line spacing and escapement of the carriage. Fig. 5 is a section taken along the line 5—5 of Fig. 2 and illustrates the shafts for operating the escapement, the line space and the automatic carriage return. Fig. 6 is a vertical section taken along the line 6—6 of Fig. 2 and illustrates in detail the line space, and the carriage return. Fig. 7 is a vertical section taken along the line 7—7 of Fig. 2 and illustrates connections between the carriage, and the line spacing mechanism, and the automatic carriage return. Fig. 8 is a section taken along the line 8—8 of Fig. 6 and illustrates the clutch for operating the automatic carriage return. Fig. 9 is a section through the tabulator shaft for controlling the automatic return of the carriage and is a section taken along the line 9—9 of Fig. 7. Fig. 10 is a fragmentary elevation, partly in section, illustrating the escapement drum for the carriage and the tabulator shaft. Fig. 11 is a side elevation of the escapement drum of the carriage. Fig. 12 is a section taken along the line 12—12 of Fig. 11. Fig. 13 is a vertical section taken along the line 13—13 of Fig. 4 and illustrates the manual trip for operating the return of the carriage by power.

The present invention consists in providing carriage control mechanisms for a calculating machine whereby the various movements thereof are automatic and such automatic movements are determined by the operation of the calculating machine itself.

In Fig. 1 is illustrated a plan view of the entire mechanism illustrating the carriage and carriage controlling mechanisms at the rear of the machine. Indirectly these carriage controlling mechanisms are set for operation by the keys of the key-board 6 which determine the variable movements of the number bearing members 9 of the totalizer. These number bearing members are driven from a plurality of shafts 7 known as totalizer power shafts. Two of these shafts 7 are extended to the rear of the totalizer into the space occupied by the carriage controlling mechanism, as illustrated in Fig. 4.

Mounted at the rear of the machine are a plurality of transverse guideways 253 between which reciprocates the carriage 254 carrying the platen 255. One side of the carriage is provided with the usual rack 256 provided for the escapement of the carriage and the return thereof. A spring drum 258 is mounted upon one side of the machine and is connected by a tape 259 with the carriage 254. This spring drum exerts a pull upon the carriage and causes the carriage to escape in the usual manner.

*Escapement.*—The escapement utilized in the present invention is both manual and automatic and is of such a nature that it in reality acts as a tabulator. The mechanism is so timed that each time the carriage escapes a new column is presented to the type segments 337 of the machine and differs in this respect from the ordinary escapement.

A vertical shaft 262 is located at the rear of the machine adjacent to the carriage 254 and is provided at its upper terminal with a gear 261 which meshes with the rack 256. The lower terminal of this shaft is provided with a beveled gear 263 which meshes with a similar gear 264 keyed to the shaft 265, said shaft being mounted in suitable bearings 266. A shaft 268 is arranged at right angles to the shaft 265 and is positioned to impart a rotary motion to the latter through the medium of the beveled, meshing gears 267, 269. A disk 270a and a notched disk 270 are loosely mounted upon the shaft 268 and are secured together for simultaneous rotation upon said shaft, the disks being constructed from a single piece of material or collared or secured together in any suitable manner. The disk 270a is provided with a plurality of outwardly extending studs 271 which coöperate with a spring actuated detent 272 pivotally mounted as at 273 to arrest the movement of the disks aforesaid. A disk 274 is keyed to the shaft 268 adjacent to the disk 270 and is provided with a pawl 275 operated upon by the leaf spring 276 to force the terminal of said pawl against the periphery of the disk 270 and into the notches thereof. A secondary spring pressed pawl 277 is also mounted upon a disk 274 and acts against the notched disk 270 to lock the same from retrograde rotation. Pivotally mounted on a suitable support 278 is an escapement dog 280, an extension 279 of which normally rests against a stationary stop 282. The escapement dog is provided with a semicircular depression 281 which co-acts with the studs 271 to permit the escapement of the carriage. A tooth 291 is also provided upon the escapement dog for the automatic operation thereof.

It is manifest that the tension of the spring drum upon the carriage will create a tendency through the medium of the shafts 262, 265 to rotate the shaft 268, but as will be apparent from Fig. 4, the body of the escapement dog normally rests against one of the studs 271 and is retained in this position by the stop 282 or spring 283 which operate against the extension 279 of the escapement dog. This position of the escapement dog prevents the shaft 268 from rotating by reason of the fact that the toothed disk 270 is locked to said shaft by the pawl 275 and thereby overcomes the rotary tendency on the part of the shaft by the spring drum. At the same time, if it is desired to return the carriage to its initial position this may be done without changing the adjustment of the escapement dog or other coöperating elements, as the rotary movement of the shaft 268 will be reversed and, hence, the dogs 277 and 275 will ride over the notches of the disk 270 while the detent 272 prevents any movement on the part of the disks 270 and 270a. To provide for the escapement of the carriage it will be seen that if the escapement dog 280 is rocked about its axis the recess 281 therein will be alined with the stud 271 which rests against the body of the dog. This permits the spring drum to act upon the carriage to escape the same as the stud 271 aforesaid enters the depression 281. As the escapement dog returns to its normal position under tension of the spring 283 the body of the dog will engage the next adjacent stud 271 and permit the stud 271 engaged by the recess 281 to pass therefrom. In the present exemplification of this invention there are four of these studs illustrated and consequently, for each escapement the shaft 268 makes a quarter of a revolution. The escapement, of course, may be timed by regulating the amount of rotation which the shaft 268 is permitted to take. It is obvious, therefore, that in order that the carriage 254 may escape, the escapement dog 280 must be rocked about its pivotal point 268. This is accomplished by one of two methods, to-wit, automatically or manually. The method of automatically rocking the escapement dog 280 consists of a cam 290 keyed to and mounted for reciprocation on one of the extended totalizer power shafts 7, the cam surface of which is adapted when so set, to contact with the tooth 291 of the escapement dog, and such contact will rock said dog about its pivotal point at each operation of the machine and permit the carriage to escape. It is to be understood that when a calculation is performed all of the shafts 7 rotate one complete cycle and these shafts rotate at all times when the machine is operated, whether a calculation is being performed or not and, consequently, if the machine is being used for listing purposes only, the automatic escapement, if set, will operate irrespective of the activity of the totalizer.

Mounted near the base of the machine and adjacent to the escapement clutch heretofore described is a shaft 295 provided with an upwardly extending arm 296, the terminal of which has a lug 297 entering into a groove 298 formed in the hub of the cam 290. One terminal of this shaft is provided with a crank arm 311 connected at its outer terminal to the stem 310 of a key 309. When the key 309 is depressed the shaft 295 will be oscillated to bring the cam 290 into vertical alinement with the tooth 291 so that when the shaft 7, carrying the cam, is rotated, the cam surface will engage said tooth.

The escapement dog is rocked or operated manually by a key 285 carried by a stem 286, the lower terminal of which is bent at right angles to engage a pin 288 carried by an extension 279. When the key 285 is depressed the terminal 287 of the stem will operate against a pin 288, rocking the dog 280 and permitting the escapement to operate. The key is then returned to its initial position by a spring 289ª.

*Line space.*—The line spacing mechanism provided for the platen of the present invention is of such construction that the same may automatically be operated, or such automatic mechanism may be made inactive and the platen operated manually.

The shaft which carries the platen 255 for rotation is provided at its terminal with a gear 323, which meshes with a gear 321ª keyed to a shaft 321, which shaft is secured to the carriage 254 and is adapted to reciprocate therewith. The rotation imparted to the shaft 321 will naturally be imparted to the gear 323 and, hence, to the platen and, consequently, in order to automatically rotate the platen for line spacing purposes the shaft 321 must be rotated from the calculating machine. For accomplishing this purpose one of the extended shafts 7 is provided with a one-toothed gear 301, which rotates with said shaft 7 every time the machine is operated. Directly under the extended shaft 7 carrying the one-toothed gear 301 is a shaft 303 provided with a gear 302 keyed to said shaft for reciprocation, and which is adapted to be alined at predetermined intervals with the one-toothed gear aforesaid, through the medium of an arm 307 carried by the shaft 295 aforesaid, said arm having a lug 308 at its upper terminal operating in a grove 309 in the hub of the gear 302. The opposite terminal of the shaft 295 to the arm 311 is provided with an arm 294 extending in an opposite direction to the arm 311 and connected at its terminal to a key-stem 293, which at its upper terminal is provided with a key 292. By depressing the key 292 the shaft 295 is oscillated and the gear 302 is brought into alinement with the gear 301. This oscillation of the shaft also removes the cam 290 from alinement with the escapement dog 280. By this construction it is manifest that when the machine is operating in a single column and the line space is operating automatically the carriage will not escape. It is further manifest that when it is desired to do cross-footing the carriage should escape, but the line spacing mechanism should be inactive. For these reasons and from the construction illustrated it is apparent that when the key 292 is depressed for automatically operating the line spacing the key 309 will be elevated and the automatic escapement mechanism will be inactive, and vice versa. In order to hold the shaft 295 in either of its adjusted positions a toothed segment 299 is secured to said shaft and coöperates with the spring pressed detent 300.

The shaft 303 at its rear terminal is provided with a beveled gear 304 which meshes with the gear 305 keyed to the shaft 306. Extending vertically at right angles to the shaft 306 is a shaft 314 which is provided at its lower terminal with a beveled gear 313, which meshes with and is rotated from a beveled gear 312 carried by the shaft 306. In this manner the motion received by the shaft 303 from the extended totalizer power shaft 7 is transmitted through the shaft 306 to the shaft 314. The upper terminal of the shaft 314 is provided with a beveled gear 315 which meshes with a beveled gear 316 carried by a stub shaft 317 mounted in the bearings 318. The stub shaft also carries a spur gear 319 which is alined with the shaft 321 mounted in the carriage 254. The step-by-step rotation of the shaft 314 is imparted to the spur gear 319, as both the spur gear and beveled gear 316 are keyed to the shaft 317. The shaft 321 mounted in the carriage 254 is provided with a key 321ᵇ extending throughout its entire length, by means of which a spur gear 320 is secured to said shaft for rotation therewith and at the same time the shaft may reciprocate through the same. This spur gear 320 is mounted between two stationary arms 322, through which the shaft 321 also reciprocates and is thus held from movement with the shaft. The gear 319 is constantly in mesh with the gear 320 and as the former rotates the latter will also rotate and impart such rotary motion to the shaft 321. This motion is imparted from the shaft 321 through the gears 321ª and 323 to the platen. Thus at every rotation of the totalizer power shaft 7, while the key 292 is depressed, which is whenever the machine is operated, the platen will automatically be rotated a predetermined amount. The platen is also provided at its terminal with a knurled knob 257, by means of which it may be manually adjusted.

In cross-footing, wherein the machine operates across the entire width of the platen prior to any line spacing, it is necessary to rotate the platen upon the return of the carriage to its initial position, for the next horizontal column. This is accomplished by a ratchet wheel 324 mounted upon the upper terminal of the shaft 314, which coöperates with a spring pawl 325 carried by the bell crank 326, pivotally mounted as at 327. This bell crank is under constant tension of a spring 332 which causes the bell crank to rest against a stop 329 formed on a stationary part of the machine. The terminal of the carriage is provided with an arm 330, which is adapted to contact with the cam surface 331 on a bell crank 326. During cross footing, as has been explained, the automatic line spacing mechanism is disconnected and, hence, the shaft 314 and its coöperating shafts are free to rotate and are not locked or set in coöperative relation with any other elements of the machine. Hence, when the carriage is returned to its initial position and the arm 330 contacts with the cam surface 331 of the bell crank, said bell crank will be oscillated to impart a rotary motion to the ratchet wheel 324 by means of the pawl 325. This rotates the shaft 314 and necessarily the shaft 317 and the gears 319 and 320, and the platen. When the carriage has escaped the arm 330 leaves the cam surface 331 and the spring 332 causes the bell crank 326 to oscillate and the pawl to engage another tooth upon the ratchet wheel 324.

*Carriage return.*—The carriage return mechanism involved in the present invention is of such a nature that the carriage may be returned to its initial position either manually or automatically from any predetermined point or from any point during its escapement.

The escapement shaft 262 is provided with a gear 447 which is connected with a gear 449 loosely mounted upon a shaft 450 through the train of gears 448. The carriage return clutch is mounted upon the shaft 450 and is adapted to connect the gear 449 to the shaft 450 when it is so desired to return the carriage. A gear 451 is keyed to the shaft 450 and meshes with a gear 452 keyed to a shaft 453. This shaft 453 is provided with a beveled gear 454 at its lower end which meshes with a similar gear 455 keyed to the shaft 456. This shaft 456 is driven from the constantly running motor shaft 15 through the medium of the beveled gears 17 and 457. As the motor shaft 15 is constantly rotating the shafts 456 and 454 will also be constantly rotating, which movement will be imparted through the gears 452 and 451 to the shaft 450. Hence, whenever the gear 449 is locked to the shaft 450 said gear will rotate and such rotation will be imparted to the shaft 262 through the medium of the gears 447, 448, which will return the carriage to its initial position.

Loosely mounted upon the shaft 450 is a cam member 458 secured to or connected with a gear 449 to rotate therewith. Disposed below the cam member 458 is a disk 459 connected with a second disk 463 located adjacent thereto. A star wheel 465 is keyed to the shaft 450 adjacent to the disk 463. This disk 463 carries a clutch dog 464 provided with a shoulder 470 and which is operated upon by the spring member 466 for normally tending to throw the terminal of the dog into engagement with the star wheel. When the dog 464 is free to be acted upon by the spring 466 the terminal thereof engages the star wheel 465, which locks the disk 463 to the shaft 450 and permits the same to rotate therewith. A trip dog 467 is pivotally mounted as at 468 and is provided with a rearwardly extending tail 477, the utility of which will be hereafter apparent. Normally, the trip dog 467 engages the shoulder 470 of the dog 464 and holds the nose 462 thereof against the tension of the spring 466 and thereby retains the disk 463 out of locked engagement with the star wheel. The disk 459 carries a dog 460, operated upon by a spring 461 which normally tends to throw the nose 462 of the dog into the path of the shoulder of the cam 458. A stop 471 is so located on a stationary portion of the machine that it operates against the tail of the dog 460 to hold the same out of the path of movement of the shoulder of the cam 458. A lock dog 491 is pivotally mounted adjacent to the lower disk 463 and is provided with a tooth 490, which is received in a depression 489 in the disk 463 for locking the mechanism for overthrow.

Inasmuch as the gear 449 and the cam or one-toothed member 458 operate as a single piece and the disks 459 and 463 operate as an element and act independently of the gear 449 and cam or one-toothed member 458, it will be seen that when the dog 464 is tripped, locking the disks 459 and 463 to the shaft 450, these disks will rotate with the shaft 450. This movement of the disks 459 and 463 causes the tail of the dog 460 to disengage the stop 471 by permitting the dog to drop into the path of movement of the tooth or projection on the cam 458. The continued rotation of the disks referred to causes the nose 462 of the dog 460 to contact with the shoulder or tooth of the cam 458 and rotate the same with the disks. This movement of the cam naturally causes the gear 449 to move and such movement is transmitted to the carriage through the train of gears heretofore described, returning the same to its initial position. As the disks 459 and 463 continue rotating the trip dog 467 will engage the shoulder 470 of the dog 469 and unlock the disks 459 and 463 from the shaft. It will, therefore, be seen that at each operation of the trip dog 467 the disks 459 and 463 take a complete revolution and, hence, as the carriage only moves a predetermined distance it is necessary to provide the dog 460 which will be carried by the cam 458, but which prevents the return of the carriage from any predetermined point until the nose 462 of the dog 460 will engage the projection or tooth of the cam 458, thus regulating the return movement of the carriage in proportion to the escapement thereof. It is also manifest that as the carriage escapes the gear 261 will rotate, imparting such rotation through the gears 447, 448 to the gear 449. This movement of the gear 449 causes the cam 458 to rotate on the shaft 450, bringing the tooth or projection thereof into closer proximity with the nose 462 of the dog 460, hence the further the carriage has escaped the nearer the projection or tooth of the cam 458 is to the nose of the dog 462 and, consequently, the sooner the engagement of said projection by the nose 462 of the dog 460 when the disks 459 and 463 begin rotating with the shaft 450.

As heretofore pointed out, the mechanism can be so adjusted that the carriage will return from any predetermined point in its escapement to its initial position and in order to accomplish this a mechanism for operating the trip dog 467 must be provided which will operate on said trip dog when the carriage reaches said predetermined point.

Mounted adjacent to the tail 477 of the trip dog 467 is a shaft 475 which carries at its lower terminal a pin 476 bearing directly upon the tail of the dog 467. The upper terminal of the shaft 475 carries a crank arm 474 which is connected to a link 473. This link is acted upon by a spring 472 which returns said crank to its original position whereby the trip dog 467 is permitted to engage the shoulder 470 of the dog 464. The movement of this slide upon the arm 474 is limited by a stationary stop 473ª. It will be seen that as the slide is reciprocated in one direction a pressure through the medium of the pin 476 will be exerted upon the tail 477 of the trip dog 467, causing the same to release the dog 464. A bell crank 478 is pivotally mounted at 482 and is connected by a pin and slot connection 479, 480 with the link 473. The adjustable shaft 483 is mounted for rotation in the carriage 254 and is provided with a knob 485 at one terminal thereof, which carries an adjustment ratchet 487 that coöperates with the spring actuated detent 488. By this means it is possible to rotate the shaft to any one of a number of adjusted positions locking said shaft in any one of said adjusted positions. The body of the shaft is provided with a plurality of radiating pins 484 staggeredly arranged along said shaft at predetermined intervals. By the rotation of this shaft one of said pins is brought into alinement with a projection or tooth 486 formed on the bell crank 478. As the carriage escapes the pin adjusted to lie in the path of the tooth 486 will be advanced toward said tooth and when the same contacts with the tooth a pull will be exerted pressure upon the pin 476, causing the trip dog to be reciprocated and the dog 464 released to take one revolution from the shaft 450 to return the carriage. A spring 481 acts upon the bell crank 478 to make the same yieldable as the carriage returns to its initial position.

In order to manually operate the trip dog 467 when the shaft 483 has not been set as heretofore described or for any other reason to return the carriage to its initial position from any point in its escapement, a key 492 and key-stem 493, which key-stem is pivotally connected to a yoke 494, as illustrated in Fig. 13, are provided, the yoke being connected by means of a pin and slot connection with a rod 495 pivotally connected to the tail of the trip dog 467.

Should it be desired to return the carriage from any point in its travel, pressure may be exerted upon the key 492, which will, obviously, oscillate the trip dog 467 to release the trip dog 464.

It is manifest that the present carriage control is operable, in so far as the escapement is concerned, directly from the totalizer power shafts, and that the escapement is dependent for its automatic operation directly upon these shafts. In the present invention it is apparent that the escapement in reality amounts to a tabulating mechanism for the machine, as the items are printed or listed in columns and the entire entry in the column is printed at once; hence the escapement operates from column to column and not from digit to digit. Therefore, slight modifications in the details of construction of the mechanism illustrated are all that is necessary to apply the present invention to an escapement of a digital character, and to further apply the escapement as a tabulator feature on machines which require the same.

What I claim as new is:

1. The combination with a carriage and platen, of an escapement drum coöperating therewith, a shaft connected operably with said carriage and adapted to be rotated by the escapement thereof, an escapement coöperating with said shaft to regulate and time the escapement thereof and a rotating shaft for controlling said escapement.

2. The combination with a carriage and platen, of an escapement drum coöperating therewith, a shaft connected operably with said carriage and adapted to be rotated by the escapement thereof, an escapement coöperating with said shaft for locking the same from rotation and hence the carriage from escapement and a rotating shaft adapted to periodically release said escapement.

3. The combination with a carriage and platen, of an escapement drum coöperating therewith, a shaft connected operably with said carriage and adapted to be rotated by the escapement thereof, an escapement coöperating with said shaft for normally locking the same from rotation and hence the carriage from escapement, and a rotating member for automatically releasing said escapement to permit the shaft to rotate and the carriage to escape.

4. The combination with a carriage and platen, of an escapement drum coöperating therewith, a shaft connected operably with said carriage and adapted to be rotated by the escapement thereof, an escapement coöperating with said shaft for normally locking the same from rotation and hence the carriage from escapement, and a rotating cam for operating said escapement to release said shaft and permit the carriage to escape.

5. The combination with a carriage and platen, of a stationary line spacing shaft, a constant connection between said shaft and said platen, means for imparting a predetermined rotation to said shaft, and means for controlling the movement of said shaft from the movement of the carriage and platen.

6. The combination with a carriage and platen, of a line spacing shaft constantly and operatively connected with said platen, two independent driving mechanisms for said shaft, and means controlled by a printing operation for automatically actuating one of said driving mechanisms.

7. The combination with a carriage and platen, of a line spacing shaft constantly and operatively connected with said platen, and a plurality of independent driving mechanisms for said shaft, one mechanism being automatically operable independent of the movement of the carriage, and the other being automatically operable from the movement of the carriage.

8. The combination with a carriage and platen, of a line spacing shaft constantly and operatively connected with said platen, and a plurality of independent driving mechanisms for said shaft, one mechanism being automatically operable independent of the movement of the carriage.

9. The combination with a carriage and platen, of a line spacing shaft constantly and operatively connected with said platen, and a plurality of independent driving mechanisms for said shaft, one of said mechanisms being automatically operable from the movement of the carriage.

10. The combination with a carriage, of means for feeding said carriage forwardly, gearing driven by said feeding means, and separate means for operating said gearing for automatically returning said carriage to its initial position from any one of a plurality of predetermined positions.

11. The combination with a carriage, of an escapement shaft, a power shaft, and means for connecting said power shaft with said escapement shaft, and means for automatically controlling said connecting means for causing said means to return the carriage to its initial position.

12. The combination with a carriage, of an escapement shaft connected therewith, a power shaft, and a clutch connecting said power shaft with said escapement shaft, and means for automatically actuating said clutch for returning the carriage to its initial position.

13. The combination with a carriage, of an escapement shaft connected therewith, a power shaft, a clutch connecting said power shaft with said escapement shaft, and means for automatically operating said clutch at any one of a plurality of predetermined positions.

14. The combination with a carriage, of an escapement shaft connected therewith, a power shaft, a clutch connecting said power shaft with said escapement shaft, means for manually operating said clutch, and means for automatically operating said clutch.

In testimony whereof I have signed my name to this specification, in the presence of two subscribing witnesses, on this 19th day of September, A. D. 1912.

PAUL H. BERGER.

Witnesses:
CHARLES H. SEEM,
K. W. WONNELL.

Copies of this patent may be obtained for five cents each, by addressing the "Commissioner of Patents, Washington, D. C."